United States Patent
Gnanasekaran et al.

(10) Patent No.: US 8,160,072 B1
(45) Date of Patent: Apr. 17, 2012

(54) METHOD AND SYSTEM FOR FACILITATING QOS ZONING IN A NETWORK

(75) Inventors: Sathish K. Gnanasekaran, Sunnyvale, CA (US); Ponpandiaraj Rajarathinam, Sunnyvale, CA (US); Vineet M. Abraham, Sunnyvale, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 264 days.

(21) Appl. No.: 12/636,591

(22) Filed: Dec. 11, 2009

(51) Int. Cl.
*H04L 12/28* (2006.01)
(52) U.S. Cl. ........ 370/392; 370/229; 370/389; 370/235; 370/468
(58) Field of Classification Search .......................... None
See application file for complete search history.

(56) References Cited

U.S. PATENT DOCUMENTS

| | | | |
|---|---|---|---|
| 6,963,578 B2 * | 11/2005 | Akahane et al. | 370/417 |
| 7,239,641 B1 * | 7/2007 | Banks et al. | 370/397 |
| 7,664,904 B2 * | 2/2010 | Oshikiri et al. | 710/316 |
| 2007/0211746 A1 * | 9/2007 | Oshikiri et al. | 370/437 |

\* cited by examiner

*Primary Examiner* — Duc C Ho
(74) *Attorney, Agent, or Firm* — Shun Yao; Park, Vaughan, Fleming & Dowler LLP

(57) ABSTRACT

One embodiment of the present invention provides a system that facilitates end-to-end quality of service (QoS) between a source and a destination in a network. During operation, the system allocates virtual channels on an output port of a switch to a number of quality of service (QoS) levels. The system further assigns a virtual channel to a traffic flow based on a QoS zone, wherein the QoS zone is identified by a host identifier, a target identifier, and a QoS level of the traffic flow. In addition, the system forwards data frames in the traffic flow via the assigned virtual channel.

21 Claims, 6 Drawing Sheets

METHOD AND SYSTEM FOR FACILITATING QOS ZONING IN A NETWORK

BACKGROUND

1. Field

The present disclosure relates to communication networks. More specifically, the present disclosure relates to a method and system for facilitating quality-of-service (QoS) zoning in a network.

2. Related Art

The proliferation of the Internet and e-commerce continues to fuel revolutionary changes in the network industry. Today, a significant number of transactions, from real-time stock trades to retail sales, auction bids, and credit-card payments, are conducted online. Consequently, many enterprises rely on existing storage area networks (SANs), not only to perform conventional storage functions such as data backup, but also to carry out an increasing number of egalitarian network functions such as building large server farms.

Historically, conventional network appliances (e.g., data-center servers, disk arrays, backup tape drives) mainly use SAN to transfer large blocks of data. Therefore, the switches provide only basic patch-panel-like functions. In the past decade, however, drastic advances occurred in almost all the network layers, ranging from physical transmission media, computer hardware and architecture, to operating system (OS) and application software.

For example, a single-wavelength channel in an optical fiber can provide 10 Gbps of transmission capacity. With wavelength-division-multiplexing (WDM) technology, a single strand of fiber can provide 40, 80, or 160 Gbps aggregate capacity. Meanwhile, computer hardware is becoming progressively cheaper and faster. Expensive high-end servers can now be readily replaced by a farm of many smaller, cheaper, and equally fast computers. In addition, OS technologies, such as virtual machines, have unleashed the power of fast hardware and provide an unprecedentedly versatile computing environment.

As a result of these technological advances, a SAN switch fabric faces a much more heterogeneous, versatile, and dynamic environment. The limited network functions in a conventional switch fabric, such as a Fibre Channel (FC) fabric, can hardly meet these demands. For instance, a switch fabric may transport two data flows with different requirements on the same inter-switch link, where one flow is between two mission-critical applications and the other is for a simple data backup. These two flows have different quality of service (QoS) requirements, which are difficult to attain at the same time in conventional FC networks.

SUMMARY

One embodiment of the present invention provides a system that facilitates end-to-end quality of service (QoS) between a source and a destination in a network. During operation, the system allocates virtual channels on an output port of a switch to a number of quality of service (QoS) levels. The system further assigns a virtual channel to a traffic flow based on a QoS zone, wherein the QoS zone is identified by a host identifier, a target identifier, and a QoS level of the traffic flow. In addition, the system forwards data frames in the traffic flow via the assigned virtual channel.

In a variation on this embodiment, the system allows a user to configure the QoS zone by specifying a host identifier, a target identifier, and the QoS level.

In a variation on this embodiment, the QoS level is indicated by a prefix of the identifier of the QoS zone.

In a variation on this embodiment, the host identifier and the target identifier are both Fibre Channel world wide names.

In a variation on this embodiment, the QoS level of the QoS zone is designated as high, medium, or low.

In a variation on this embodiment, allocating the virtual channels to the QoS levels involves allocating a predetermined number of virtual channels to a respective QoS level and allocating a predetermined amount of bandwidth of the output port to these virtual channels.

In a variation on this embodiment, the system converts the traffic flow to a default QoS priority level in response to determining that a next-hop switch does not support QoS zones.

DETAILED DESCRIPTION

Overview

In embodiments of the present invention, the problem of provisioning end-to-end quality of service (QoS) in a network is solved by facilitating QoS-enforceable end-to-end zones in a network. In one embodiment, an FC zoning technique is extended to include a QoS parameter. QoS-enforceable world-wide-name based zones can be provisioned in an end-to-end fashion, from a host to a target device. Such a QoS zoning technique can enforce QoS parameters through out the entire path from the host to the target. Compared with conventional FC zoning, the QoS zoning technique not only ensures isolation of traffic between different zones, but also ensures certain QoS parameters are met within a zone corresponding to a given QoS priority.

End-to-end zone-based QoS provisioning allows fine-grained allocation of network resources to applications while categorizing the relative importance of the application into high, medium, and low QoS priorities. When applications become dynamic, the QoS zones can follow the applications as they move between hosts and fabric connections. In particular, using virtual channels enables the switch fabric to enforce end-to-end QoS zoning and provides a much more versatile and flexible network environment.

Network Architecture

Figure 1:
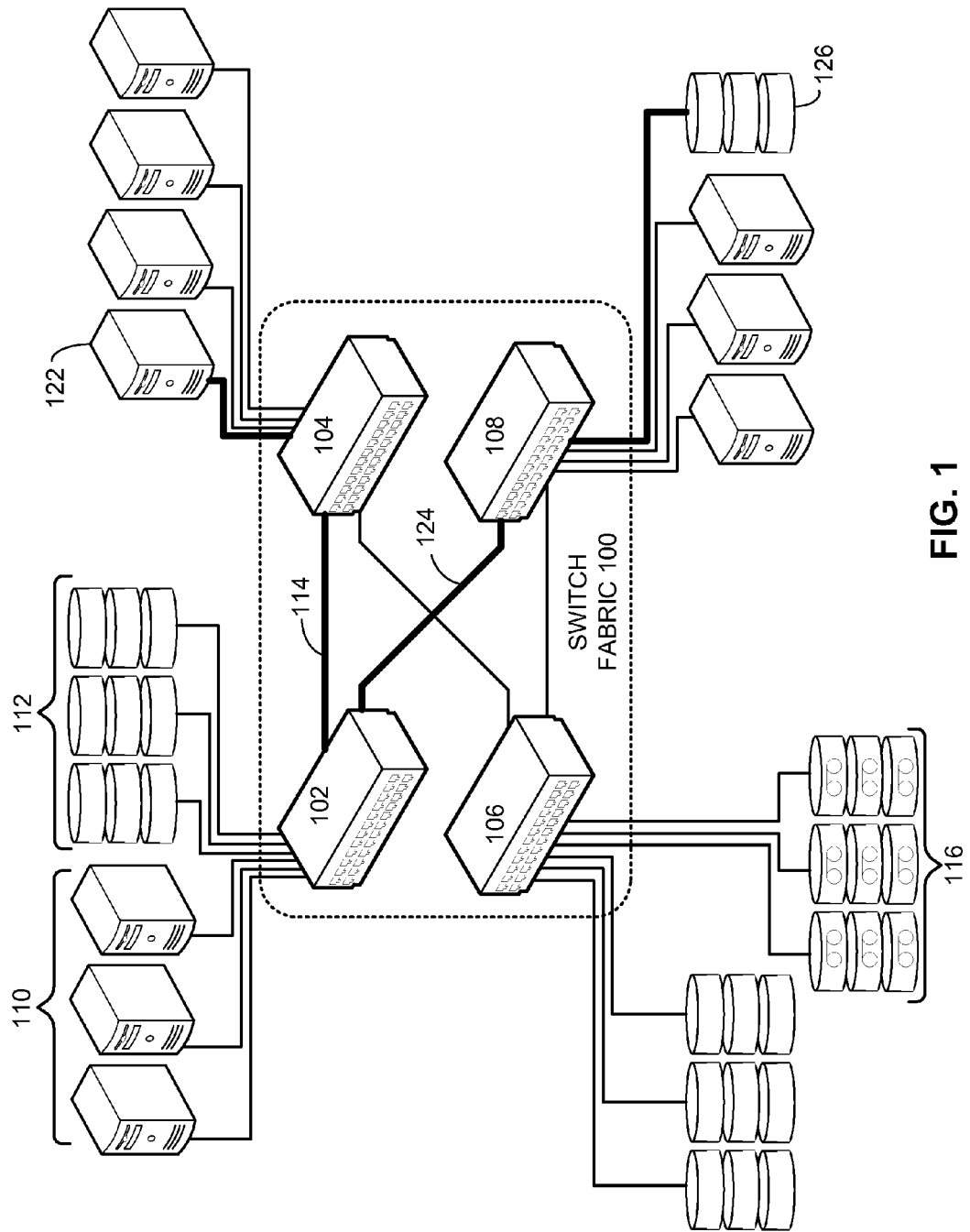
FIG. 1 illustrates an exemplary FC network that provides QoS zoning capabilities, in accordance with an embodiment of the present invention.

FIG. 1 illustrates an exemplary FC network that provides QoS zoning capabilities, in accordance with an embodiment of the present invention. In this example, an FC switch fabric 100 includes four switch modules, 102, 104, 106, and 108. Each switch module is coupled to a group of network appliances. For example, switch module 102 is coupled to a number of servers 110 and a number of disk arrays 112. A respective network appliance can communicate with any appliance (referred to as "target") in the FC network.

For example, one of the servers 110 can transfer data to and from one of tape backup devices 116. Note that, since the switch modules are not connected in a fully meshed topology, the data frames transferred between servers 110 and tape devices 116 traverse three switch modules 102, 104, and 106. In general, the switch modules are coupled by inter-switch links (ISLs), such as ISL 114.

In the example shown in FIG. 1, a QoS zone is configured for the traffic flow from host 122 to target 126, and this QoS zone is designated with a high QoS priority. In one embodiment, a QoS zone is defined by the world-wide-names of the host and target, and a QoS priority. Here, the QoS zone between host 122 and target 126 has a high QoS priority. This priority is enforced across all the switches and ISLs traversed by the corresponding traffic flow. Specifically, switches 104, 102, and 108 (and correspondingly ISLs 114 and 124) are expected to allocate sufficient bandwidth and buffer space to accommodate the traffic between host 122 and target 126, such that the service quality between them meets the high-priority QoS parameters. In one embodiment, the QoS between the switches is enforced by allocating virtual channels (VCs) dedicated to a given QoS priority. More details about VCs are provided in the section below.

As shown in the example in FIG. 1, large-port-count FC switch fabrics often include a number of smaller, interconnected individual switches. The internal connectivity of a switch fabric can be based on a variety of topologies. In this disclosure, the term "switch fabric" refers to a number of interconnected FC switch modules. The terms "switch module" and "switch" refer to an individual switch which can be connected to other switch modules to form a larger port-count switch fabric. The term "edge device" refers to any network appliance, either physical or logical, coupled to a switch.

A switch typically has two types of ports: fabric port (denoted as F_Port), which can couple to a network appliance, and extension port (E_Port), which can couple to another switch. A network appliance communicates with a switch through a host bus adaptor (HBA). The HBA provides the interface between an appliance's internal bus architecture and the external FC network. An HBA has at least one node port (N_Port), which couples to an F_Port on a switch through an optical transceiver and a fiber optic link. More details on FC network architecture, protocols, naming/address convention, and various standards are available in the documentation available from the NCITS/ANSI T11 committee (www.t11.org) and publicly available literature, such as "Designing Storage Area Networks," by Tom Clark, 2nd Ed., Addison Wesley, 2003, the disclosure of which is incorporated by reference in its entirety herein.

Virtual Channel

Conventionally, to prevent a target device from being overwhelmed with data frames, an FC network provides several flow control mechanisms based on a buffer credit system. A credit represents a device's ability to accept one frame. A sender maintains a transmission buffer, and retrieves and transmits one frame when a credit is received from the receiving device. In previous generations of FC switches, each outgoing link on a switch or HBA is associated with one buffer. This buffer is responsible for storing data frames from data flows. In this disclosure, the term "data flow" (also referred to as "traffic flow") is loosely defined as the data frames flowing from a source ID (S_ID) to a destination ID (D_ID). In conventional FC networks, the source ID refers to the outgoing port on the source HBA, and the destination ID refers to the incoming port on the destination HBA. In this disclosure, however, a source or destination ID can be associated with a wide range of logical entities, including a physical appliance (e.g., a physical server) to which an HBA belongs, a virtual appliance, an application, or a sub-application message group.

One problem associated with the conventional buffer configuration is that it is very difficult to provide different QoS to different data flows when these data flows are transported on a common link. For example, if the receiving device of a data flow is very slow in processing the received data frames, the source device is likely to flood the buffers along its data path with its data frames. As a result, other data flows will not be able to use these buffers. Furthermore, the data frames from the slow flow can cause head-of-the-queue block to the buffers along the data path, resulting in under-utilization of the network.

One way to solve this problem is to divide the bandwidth in an inter-switch link into logical channels and serve each logical channel with a separate buffer. This way, different data flows can be assigned to different logical channels and, since each logical channel has a separate buffer, the data flows can be sufficiently isolated from each other. Furthermore, a switch can provide different QoS levels to the logical channels, because it is now possible to implement various buffer scheduling schemes. For example, it is now possible to allocate different guaranteed or best-effort data rates to different logical channels or groups of logical channels by using a weighted round-robin scheme when retrieving and transmitting data frames stored in the different buffers.

In one embodiment, such logical channels are also referred to as "virtual channels" or "VCs." More implementation details of virtual channels are disclosed in U.S. Pat. No. 7,239,641, entitled "Quality of Service Using Virtual Channel Translation" by Banks, et al., and "Virtual Channels for Switched Fabric" by Martin, et al., available at www.t10.org/ftp/t11/document.04/04-093v0.pdf, the disclosure of which is incorporated by reference herein in its entirety.

Note that the virtual channel concept in FC networks should be distinguished from "virtual circuit" (which is sometimes also called "virtual channel") in ATM networks. An ATM virtual circuit is an end-to-end data path with a deterministic routing from the source to the destination. That is, in an ATM network, once the virtual circuit for an ATM cell is determined, the entire route throughout the ATM network is also determined. More detailed discussion on ATM virtual circuits can be found in "Computer Networks," Section 5.6, by A. S. Tanenbaum, 3rd Ed., Prentice-Hall, 1996.

In contrast, an FC virtual channel is a local logical channel for a respective link between switches. That is, an FC virtual channel only spans a single link. When an FC data frame traverses a switch, the virtual channel information can be carried by appending a temporary tag to the frame. This allows the frame to be associated to the same VC identifier on an outgoing link of the switch. However, the VC identifier does not determine a frame's routing, because frames with different destinations can have the same VC identifier and be routed to different outgoing ports. An ATM virtual circuit, on the other hand, spans from the source to the destination over multiple links. Furthermore, an FC virtual channel carries FC data frames, which are of variable length. An ATM virtual circuit, however, carries ATM cells, which are of fixed length.

Figure 2:
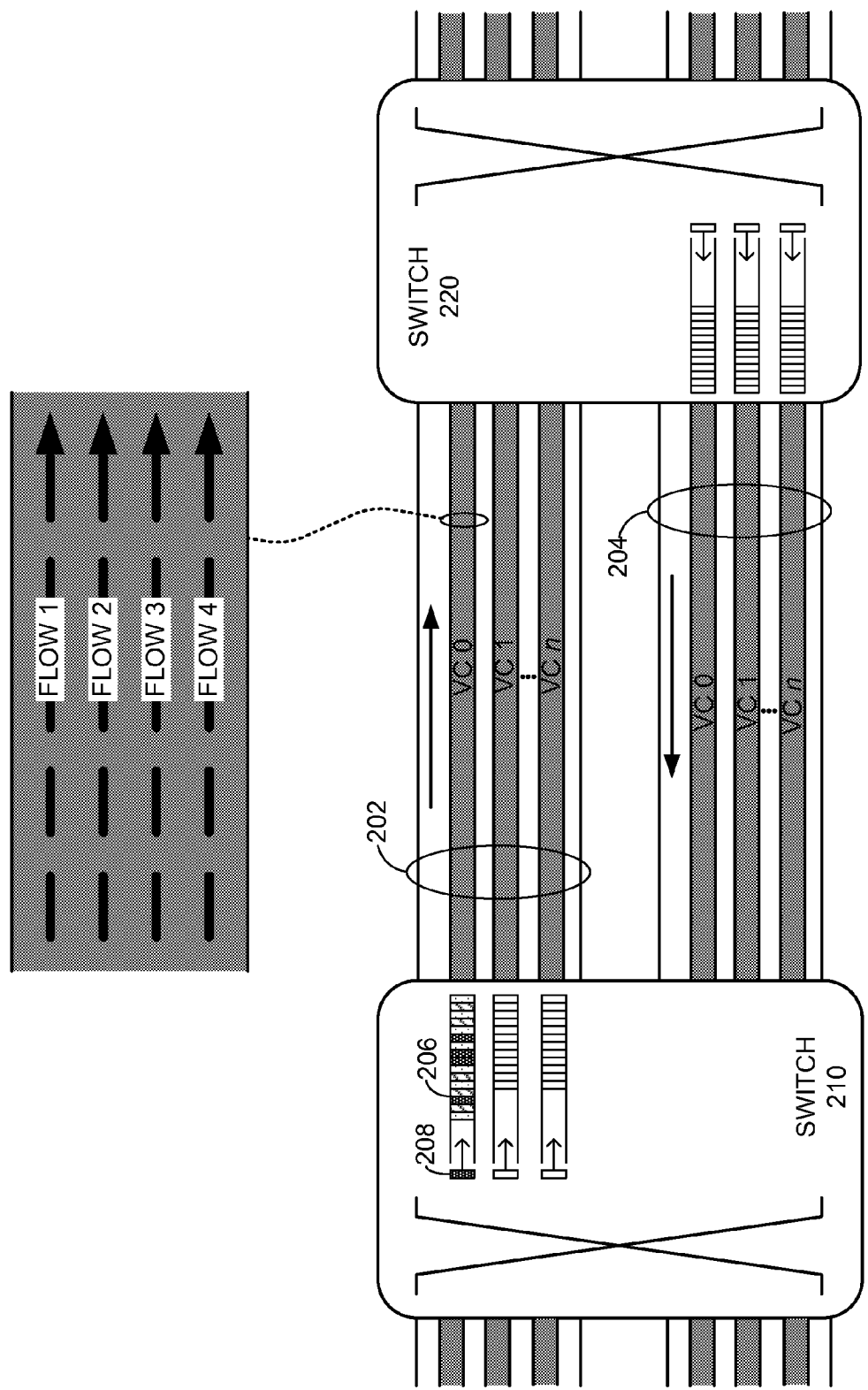
FIG. 2 illustrates exemplary virtual channels and data flows, in accordance with an embodiment of the present invention.

FIG. 2 illustrates exemplary virtual channels and data flows, in accordance with an embodiment of the present invention. In this example, a switch 210 is coupled to a switch 220 by an outgoing physical link 202 and an incoming physical link 204. The bandwidth on each physical link is divided into a number of virtual channels. For example, link 202 is divided into virtual channels VC 0, VC 1, . . . , VC n. A respective virtual channel is associated with a buffer dedicated to that virtual channel. Furthermore, a buffer may store data frames from a number of data flows. Correspondingly, a virtual channel can carry multiple data flows.

For example, VC 0 on link 202 is associated with a transmission buffer 206 in switch 210. Buffer 206 stores data frames from multiple data flows, such as data frame 208. Note that in FIG. 2 different frames of different data flows in buffer 206 are presented with different fill patterns. FIG. 2 also illustrates a zoomed-in view of the contents of VC 0 on link 202. Here VC 0 of link 202 carries four data flows, FLOWs 1, 2, 3, and 4. These flows may correspond to the same source and destination or to different sources and destinations. In other words, although these flows share the same virtual channel on link 202, they might belong to different end-to-end routes. This is an important distinction between FC virtual channels and ATM virtual circuits, because all the data cells in an ATM virtual circuit belong to the same source/destination pair.

QoS Zoning

End-to-end QoS provisioning allow latency-sensitive applications to share storage resources alongside throughput-intensive applications through traffic differentiation and prioritization. In embodiments of the present invention, end-to-end QoS provisioning is provided via S_ID/D_ID based QoS zoning. With QoS zoning, data flows are prioritized in advance to ensure workloads of critical applications have sufficient network resources dedicated to them, while traffic for less critical applications is throttled when congestion occurs.

In accordance with embodiments of the present invention, the fabric ingress port determines the QoS priority based on information contained in the data frame header and configuration of the zoning services. Unlike conventional zones, a QoS zone typically includes only two end points, i.e., a host and a target, and is identified by their respective world-wide-name (WWN) identifiers. In one embodiment, to set up a QoS zone, the network administrator creates a special zone with a QoS priority prefix in the zone name. The QoS priority prefix defines the QoS class, while the zone member tuple (source, destination) identifies the data flow associated with this QoS priority.

In order to prioritize a data flow between the host, ISLs between intermediate switches, and the destination, the data flow is classified and optionally conditioned at the boundaries of the network, and assigned to different behavior aggregates. Each behavior aggregate is identified by a VC. Within the core of the network, data frames are forwarded according to the per-hop behavior associated with the assigned VCs. In one embodiment, there are three levels of QoS priority: high, medium, and low. These levels are defined to support QoS between any given S_ID/D_ID pair. Other numbers of QoS priority levels can also be used. The QoS configuration is maintained as part of the existing zoning database, appearing as normal WWN zones. WWN is a unique 8-byte number identifying the HBA in an FC network. In order to distinguish QoS zones from regular FC zones, in one embodiment, QoS zones are identified by the following new prefixes: QOSH and QOSL. By default, the existing WWN zone configuration would be treated as having medium QoS priority. For example, a high-priority QoS zone can be identified by a triplet: (WWN_S, WWN_D, QOSH), wherein WWN_S is the source ID, WWN_D is the destination ID, and QOSH is the QoS prefix.

When the host and target configured for a QoS zone are coupled to a switch fabric, the QoS priority information is carried over each hop along the data path if the intermediate switches all support QoS zoning. In one embodiment, the QoS priority value is embedded in the data frames being sent out from the sources to destinations, so that the intermediate hops can select the appropriate VCs to forward these frames. If there is a switch without QoS-zoning capabilities along the path, the QoS priority for that data flow would be changed to the default level (e.g., medium) at that hop, and, from that hop onward, QoS priority will not be enforced. Path selection between the source and the destination pairs is not affected by the QoS priorities, but QoS priorities can help select the appropriate virtual channel at each ISL on an optimal path within the FC network.

In one embodiment, QoS zoning configuration is enforced by reserving network resources on the E_Ports at each hop in the FC network. To support this feature, an optional QoS license can be installed in each switch on the end-to-end path. If the QoS license is present, VC and buffers can be reserved based on the QoS requirement and resource availability. The network administrator can persistently allocate QoS VCs and buffers to specific links, for example. An internal VC mapping between the incoming VC and the outgoing VC can also be set up for the data flow, to ensure fast switching of the data frames within the switch without any further delay.

In one example, an FC switch supporting QoS priority maintains 16 VCs on each E_Port. Among the 16 VCs, five VCs are reserved for high priority data flows and are allocated 60% of the total bandwidth on that E_Port. Four VCs are assigned medium priority, and are allocated 30% of the total bandwidth. Two VCs are for low priority with 10% of the total bandwidth. Other VCs can assigned for Class_F (for network control and management) and multicast traffic. Other VC numbers and bandwidth allocation schemes are also possible.

Note that, among all the VCs on a link, the high-QoS-priority VCs with guaranteed bandwidth can have the switch periodically serving the buffer associated with these VCs to guarantee a minimum data rate. Other VCs may be assigned different weights and participate in a weighted round-robin scheme in transmitting frames in their respective buffers. Note that a variety of buffer-scheduling schemes can be used to achieve different QoS results.

Figure 3:
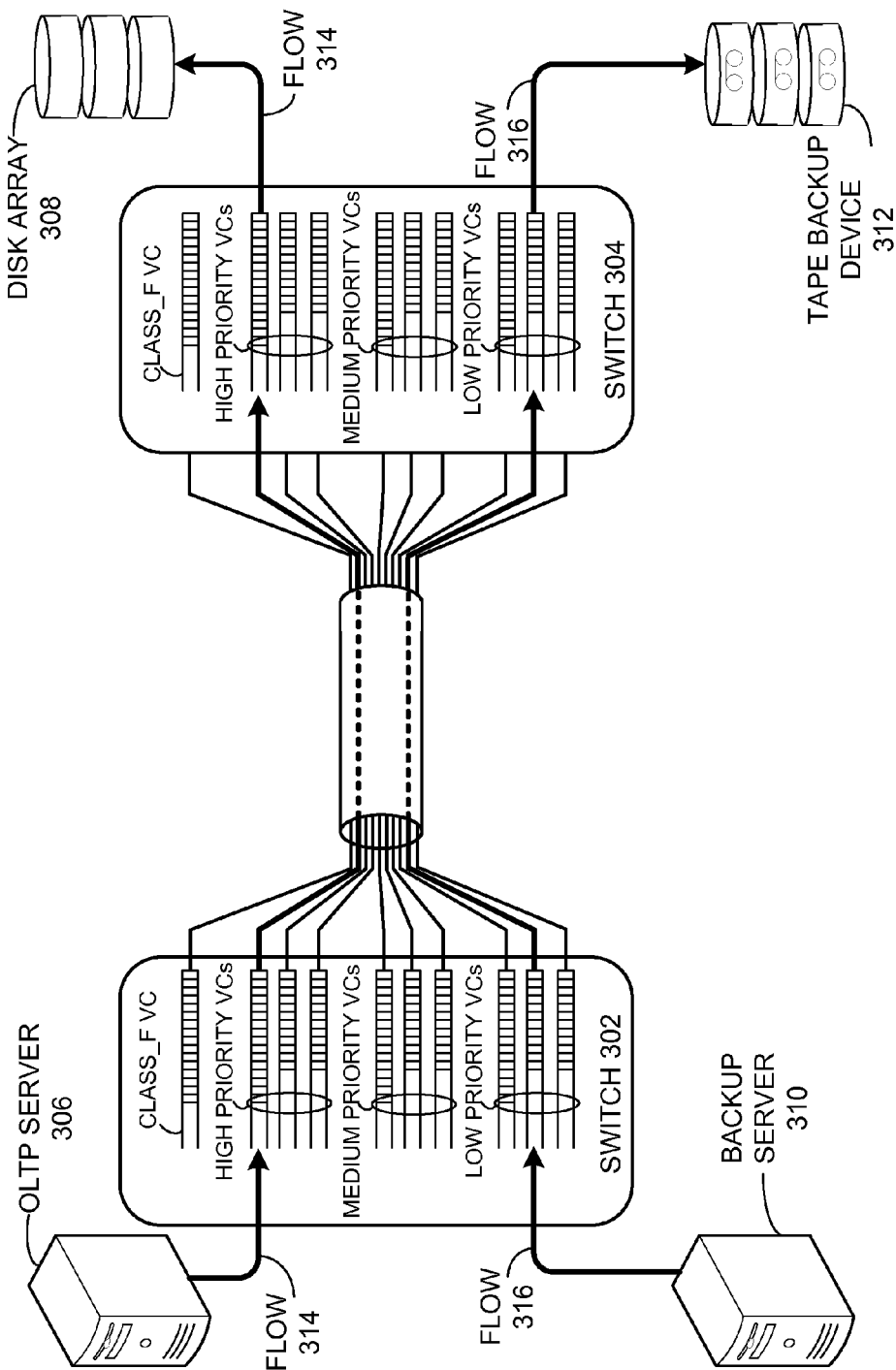
FIG. 3 illustrates an example of facilitating different QoS zones to different data flows in an FC switch fabric, in accordance with an embodiment of the present invention.

FIG. 3 illustrates an example of facilitating different QoS zones to different data flows in an FC switch fabric, in accordance with an embodiment of the present invention. In this example, the physical link between switches 302 and 304 contains a number of VCs. These VCs are grouped into several QoS classes: Class_F, high priority, medium priority, and low priority. The Class_F VC corresponds to the Class_F traffic as defined in the FC standards and carries critical network control and management traffic. In one embodiment, the Class_F VC (or VCs) is served with a strict-priority scheduling scheme. The other three QoS classes can use a weighted round-robin scheduling scheme. In one embodiment, a respective VC in the high, medium, and low QoS classes is assigned a relative weight.

In the example in FIG. 3, a data flow 314 is originated from an online transaction processing (OLTP) server 306 and destined for a disk array 308. Flow 314 carries mission-critical transaction data, and therefore is assigned to a VC with high priority. Correspondingly, a high-QoS zone is defined by the world-wide-names of OLTP server 306 and disk array 308, with a designated high QoS level. Meanwhile, a second data flow 316 is carried on the same physical link. Data flow 316 is between a backup server 310 and a tape backup device 312. Flow 316 is assigned to a VC with low priority, because backup usually does not require the same level of latency guarantee as an OLTP transaction. Correspondingly, a low-QoS zone is defined by the world-wide-names of backup server 310 and tape backup device 312, with a designated low QoS level. Since each VC has a separate buffer, flows 314 and 316 can be transported on the same physical link independent from each other. In other words, even if tape backup device 312 is slow in processing data frames, data frames from flow 316 do not interfere with the data transfer of flow 314. Furthermore, each switch enforces the QoS priority by ensuring that, when performing VC mapping between incoming and outgoing traffic, the outgoing VC for a flow is on the same QoS priority level as the incoming VC.

Figure 4:
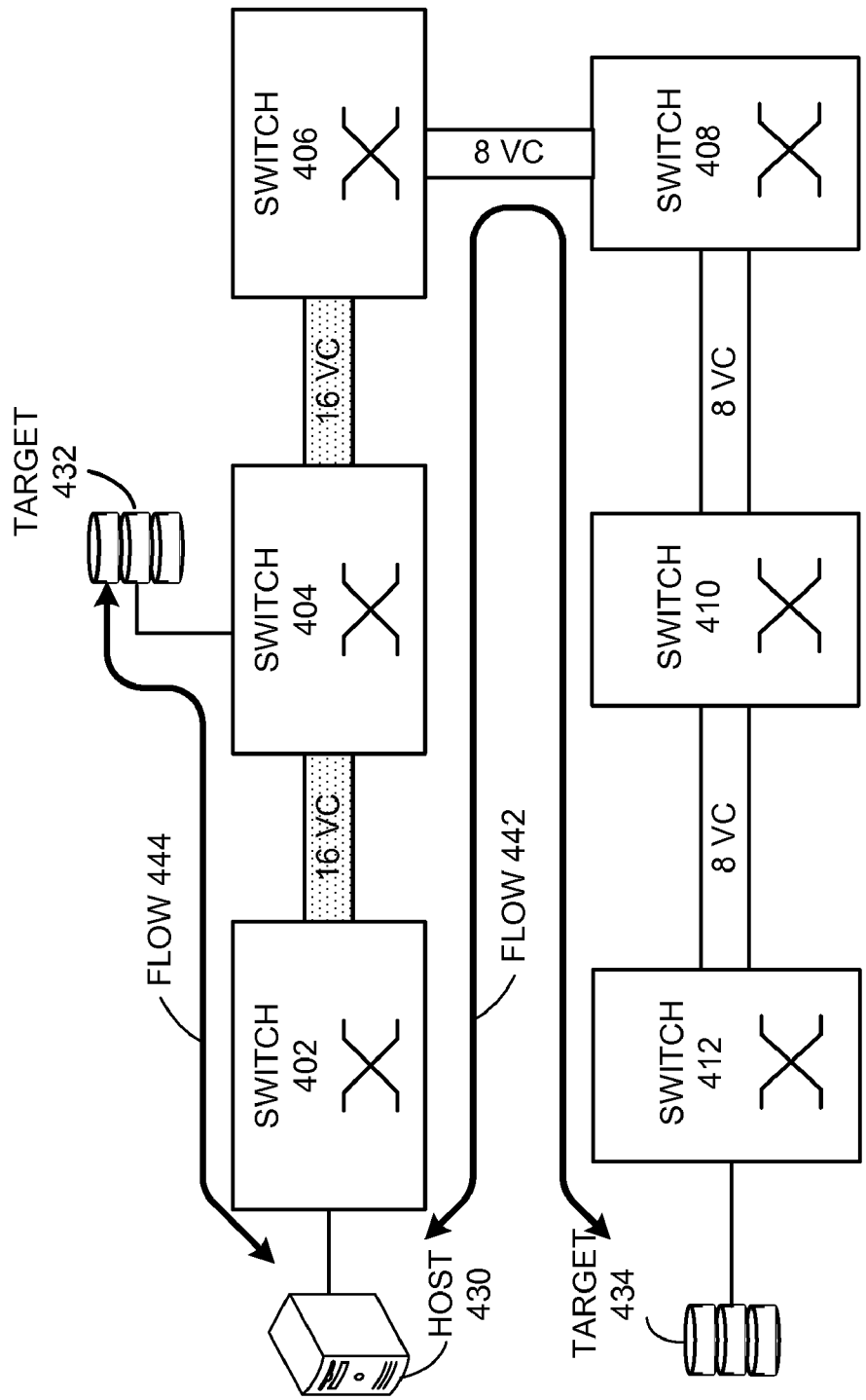
FIG. 4 illustrates the interoperability between QoS-enabled switches and legacy switches with respect to QoS zoning, in accordance with one embodiment of the present invention.

FIG. 4 illustrates the interoperability between QoS-enabled switches and legacy switches with respect to QoS zoning, in accordance with one embodiment of the present invention. As shown in FIG. 4, the fabric includes six switches, 402, 404, 406, 408, 410, and 412. Switches 402, 404, and 406 are QoS-zoning capable and supports 16 VCs on each of their E_Ports. Switches 408, 410, and 412 are legacy switches without QoS-zoning capabilities and supports only 8 VCs on each E_Port. There are two flows in this example, flow 442 between host 430 and target 434, and flow 444 between host 430 and target 432. Both flows 442 and 444 are at high QoS priority level. Correspondingly, two QoS zones, namely QOSH_flow 442 and QOSH_flow 444, are configured on every switch. Note that the QoS designation of each zone is reflected in the prefix of each zone's identifier. The presence of these prefixes (e.g., "QOSH," "QOSM," and "QOSL") does not affect the configuration of these zones on legacy switches. For example, on legacy switch 410, zone QOSH_flow 442 will be configured just like a conventional FC zone.

In the example in FIG. 4, ISLs between switches 402 and 404 and switches 404 and 406 both have 16 VCs supporting QoS zoning. ISLs coupling switches 406 and 408, 408 and 410, and 410 and 412, however, have only 8 VCs with no QoS zoning support. On these ISLs, data flows with high and low QoS priorities are collapsed into the default medium QoS class, and QoS priorities are no longer enforced. Hence, for flow 444, QoS zone QOSH_flow 444 is enforced with high QoS priority in the entire path, from host 430 to target 432. Switch 402 ensures that the VC of the incoming flow 444 is properly mapped to a VC within the high QoS priority on its ISL to switch 404. However, for flow 442, the QoS zone QOSH_flor 442 can only be enforced by switches 402, 404, and 406. When flow 442 reaches switch 408, the QoS level is dropped to medium, and QoS zone QOSH_flow 442 is treated as a conventional zone.

In order to provide end-to-end QoS, the differential treatment of flows through the FC network is ideally carried with the similar characteristics through the LAN/WAN, and FC-over-IP (FCIP) tunnels. FCIP enables interconnection of two switched FC networks using TCP/IP tunneling. In one embodiment, QoS over FCIP tunnels is preserved in two ways based on differentiated service code point (DSCP) or layer-2 class of service (L2CoS). Differentiated services, or DSCP (see IETF RFC 2474), is a layer-3 tool for classifying or prioritizing IP traffic. The Type of Service (ToS) field in the IP header contains the DSCP information. The network nodes queue and forward traffic based on the ToS value. Layer 2 Class of Service, or L2CoS (IEEE 802.1p), is a tool for classifying or prioritizing traffic in layer-2 switches, especially in the context of virtual local area network (VLAN). To preserve the QoS across a FCIP tunnel, the VC identifier on an outbound frame is mapped to both a DSCP and an L2CoS value. Both values can be defaulted to pre-determined values and modified on a per-FCIP tunnel basis. The mapping will only occur if the FCIP tunnel is configured to enable VC QoS mapping. If this mapping is enabled, the mapped values are placed into the associated egress protocol header, be it an IP header or a VLAN tag.

The QoS support on an ISL is negotiated by the E_Ports on both ends of the ISL. In one embodiment, an exchange link parameters (ELP) protocol is implemented to configure an E_Port. If the E_Port on the other end of the ISL is also QoS-enabled, the switch on the other end sends an accept message. In case the switch on the other end does not support QoS, it can reject the QoS-specific VC allocation request.

Figure 5:
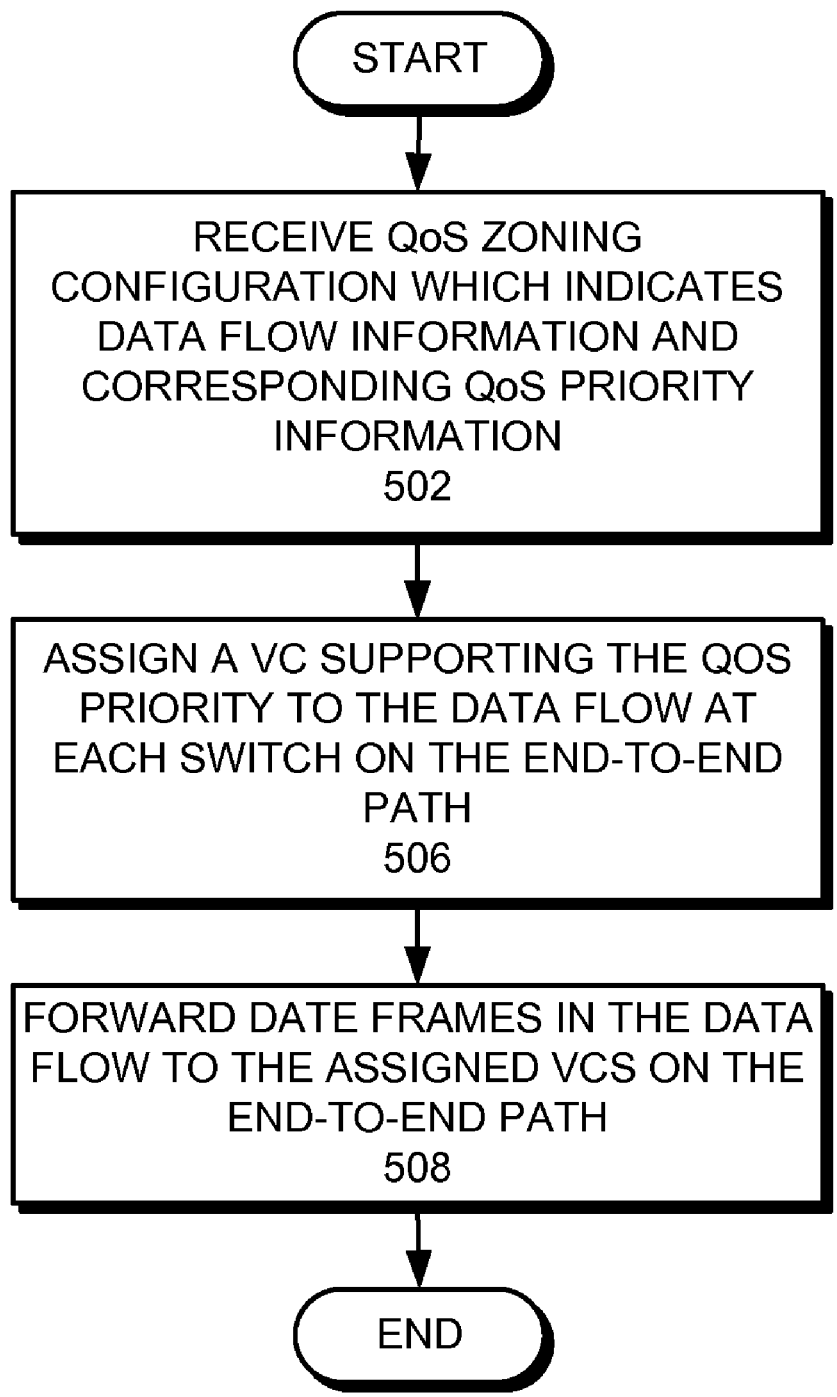
FIG. 5 presents a flowchart illustrating the process of facilitating end-to-end QoS in an FC network, in accordance with an embodiment of the present invention.

FIG. 5 presents a flowchart illustrating the process of facilitating end-to-end QoS in an FC network, in accordance with embodiments of the present invention. During operation, the system first receives QoS zoning configuration which indicates a data flow between a source and a destination and the corresponding QoS priority (operation 502). Next, the system assigns a VC supporting the QoS priority to the data flow at each switch on the end-to-end path (operation 504). Note that in this step, each switch negotiates with its upstream or downstream next-hop neighbor to determine whether QoS is supported on the corresponding link, and, if QoS is supported, determines how to map the incoming VC to an outgoing VC that maintains the QoS priority of the flow. After the QoS zone is set up, the system forwards data frames in the data flow to the assigned VCs on the end-to-end path (operation 508).

Figure 6:
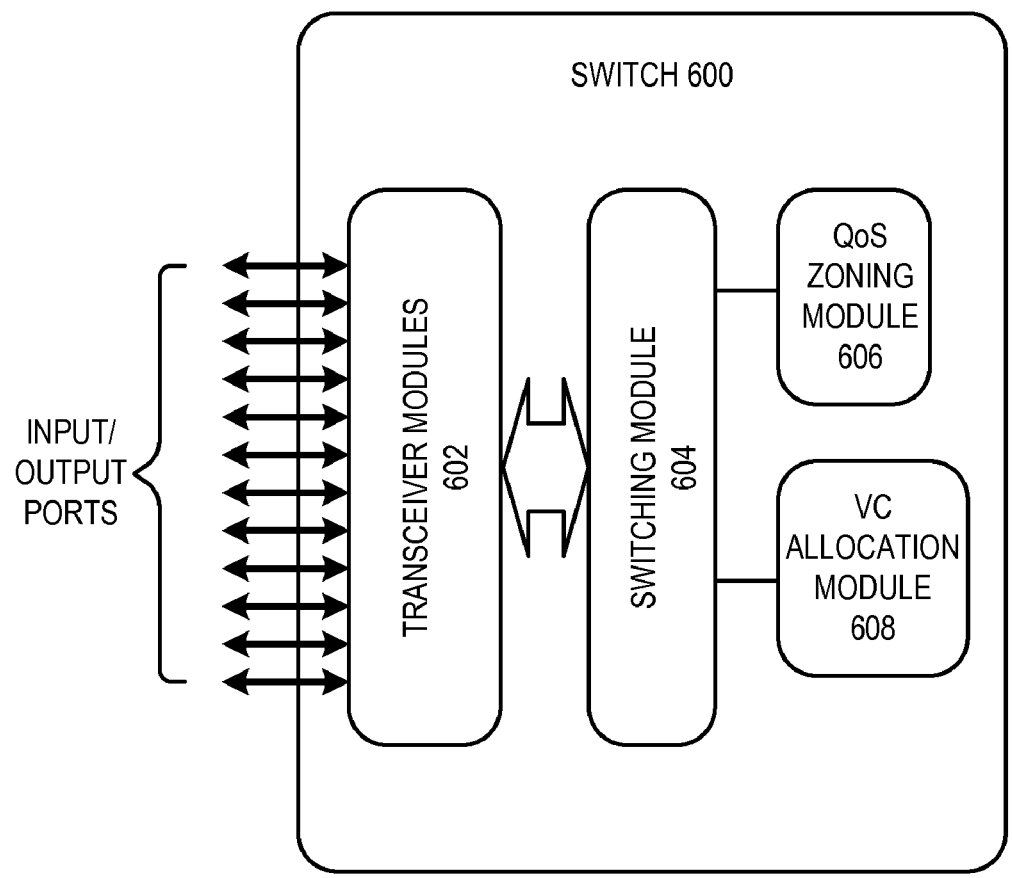
FIG. 6 illustrates an exemplary switch that facilitates QoS zoning, in accordance with one embodiment of the present invention.

FIG. 6 illustrates an exemplary switch that facilitates QoS zoning, in accordance with one embodiment of the present invention. In this example, a switch 600 includes a set of transceiver modules 602 coupled to a set of input/output ports, a switching module 604, a QoS zoning module 606, and a VC allocation module 608. Transceiver modules 602 are responsible for receiving and transmitting the physical signals at the input/output ports and converting these signals to electrical digital signals which can be processed by the circuits within switch 600. In one embodiment, a respective transceiver module can also separate the data flows from different VCs. Switching module 604 is responsible for switching input data frames to their respective output ports on desired VCs. In one embodiment, switching module 604 includes a cross-bar switch and the necessary buffers for each VC for each output port.

QoS zoning module 606 is responsible for processing QoS-zoning configuration information and setting up the zoning state. Once a QoS zone is set up, QoS zoning module 606 controls how switching module 604 switches the corresponding data flow (i.e., which VC on a respective output port the data flow should be assigned). VC allocation module 608 is responsible for setting up the VCs for a given QoS priority level and maintain the necessary state information for these VCs.

In summary, embodiments of the present invention facilitate end-to-end QoS provisioning in an FC network by implementing QoS-enforceable zones. Data flows are prioritized into different levels of QoS priority and designated to QoS-specific zones. A switch can enforce QoS zoning by mapping the VC of an incoming flow to the VC on an outgoing port that belongs to the same QoS priority level.

The description provided herein is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, application-specific integrated circuits (ASIC), field-programmable gate arrays (FPGA), volatile memory, non-volatile memory, magnetic and optical storage, or other media capable of storing computer-readable media now known or later developed.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A system comprising:
   an allocation mechanism configured to allocate virtual channels on an output port of a switch to a number of quality of service (QoS) levels;
   an assignment mechanism configured to assign a virtual channel to a traffic flow based on a QoS zone, wherein the QoS zone is identified by a host identifier, a target identifier, and a QoS level of the traffic flow; and
   a forwarding mechanism configured to forward data frames in the traffic flow via the assigned virtual channel.

2. The system of claim 1, further comprising a zone-configuration mechanism configured to allow a user to configure the QoS zone by specifying a host identifier, a target identifier, and the QoS level.

3. The system of claim 1, wherein the QoS level is indicated by a prefix of the identifier of the QoS zone.

4. The system of claim 1, wherein the host identifier and the target identifier are both Fibre Channel world wide names.

5. The system of claim 1, wherein the QoS level of the QoS zone is designated as high, medium, or low.

6. The system of claim 1, wherein while allocating the virtual channels to the QoS levels, the allocation mechanism is configured to allocate a predetermined number of virtual channels to a respective QoS level and allocate a predetermined amount of bandwidth of the output port to these virtual channels.

7. The system of claim 1, further comprising a conversion mechanism configured to convert the traffic flow to a default QoS priority level in response to determining that a next-hop switch does not support QoS zones.

8. A method comprising:
   allocating virtual channels on an output port of a switch to a number of quality of service (QoS) levels;
   assigning a virtual channel to a traffic flow based on a QoS zone, wherein the QoS zone is identified by a host identifier, a target identifier, and a QoS level of the traffic flow; and
   forwarding data frames in the traffic flow via the assigned virtual channel.

9. The method of claim 8, further comprising allowing a user to configure the QoS zone by specifying a host identifier, a target identifier, and the QoS level.

10. The method of claim 8, wherein the QoS level is indicated by a prefix of the identifier of the QoS zone.

11. The method of claim 8, wherein the host identifier and the target identifier are both Fibre Channel world wide names.

12. The method of claim 8, wherein the QoS level of the QoS zone is designated as high, medium, or low.

13. The method of claim 8, wherein allocating the virtual channels to the QoS levels comprises allocating a predetermined number of virtual channels to a respective QoS level and allocating a predetermined amount of bandwidth of the output port to these virtual channels.

14. The method of claim 8, further comprising converting the traffic flow to a default QoS priority level in response to determining that a next-hop switch does not support QoS zones.

15. A switch comprising:
    a switching module;
    a zoning module comprising:
      an allocation mechanism configured to allocate virtual channels on an output port of a switch to a number of quality of service (QoS) levels; and
      an assignment mechanism configured to assign a virtual channel to a traffic flow based on a QoS zone, wherein the QoS zone is identified by a host identifier, a target identifier, and a QoS level of the traffic flow; and
    a transmission module configured to forward data frames in the traffic flow via the assigned virtual channel.

16. The switch of claim 15, wherein the zoning module further comprises a zone-configuration mechanism configured to allow a user to configure the QoS zone by specifying a host identifier, a target identifier, and the QoS level.

17. The switch of claim 15, wherein the QoS level is indicated by a prefix of the identifier of the QoS zone.

18. The switch of claim 15, wherein the host identifier and the target identifier are both Fibre Channel world wide names.

19. The switch of claim 15, wherein the QoS level of the QoS zone is designated as high, medium, or low.

20. The switch of claim 15, wherein while allocating the virtual channels to the QoS levels, the allocation mechanism is configured to allocate a predetermined number of virtual channels to a respective QoS level and allocate a predetermined amount of bandwidth of the output port to these virtual channels.

21. The switch of claim 15, further comprising a conversion module configured to convert the traffic flow to a default QoS priority level in response to determining that a next-hop switch does not support QoS zones.

* * * * *